Feb. 2, 1932.    L. SHAY    1,843,887
VARIABLE PITCH AND REVERSIBLE AERIAL PROPELLER
Filed July 29, 1929    2 Sheets-Sheet 1
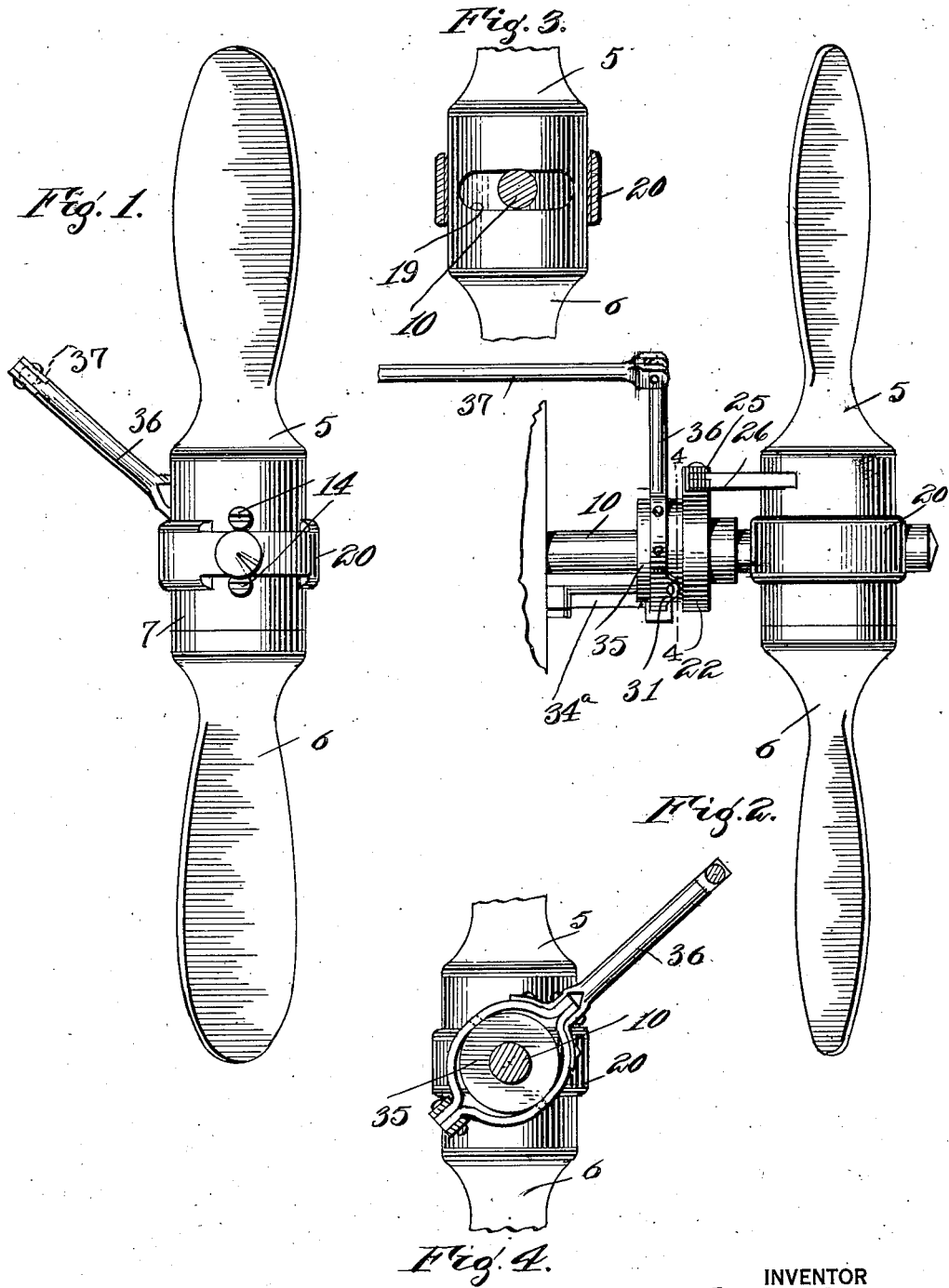

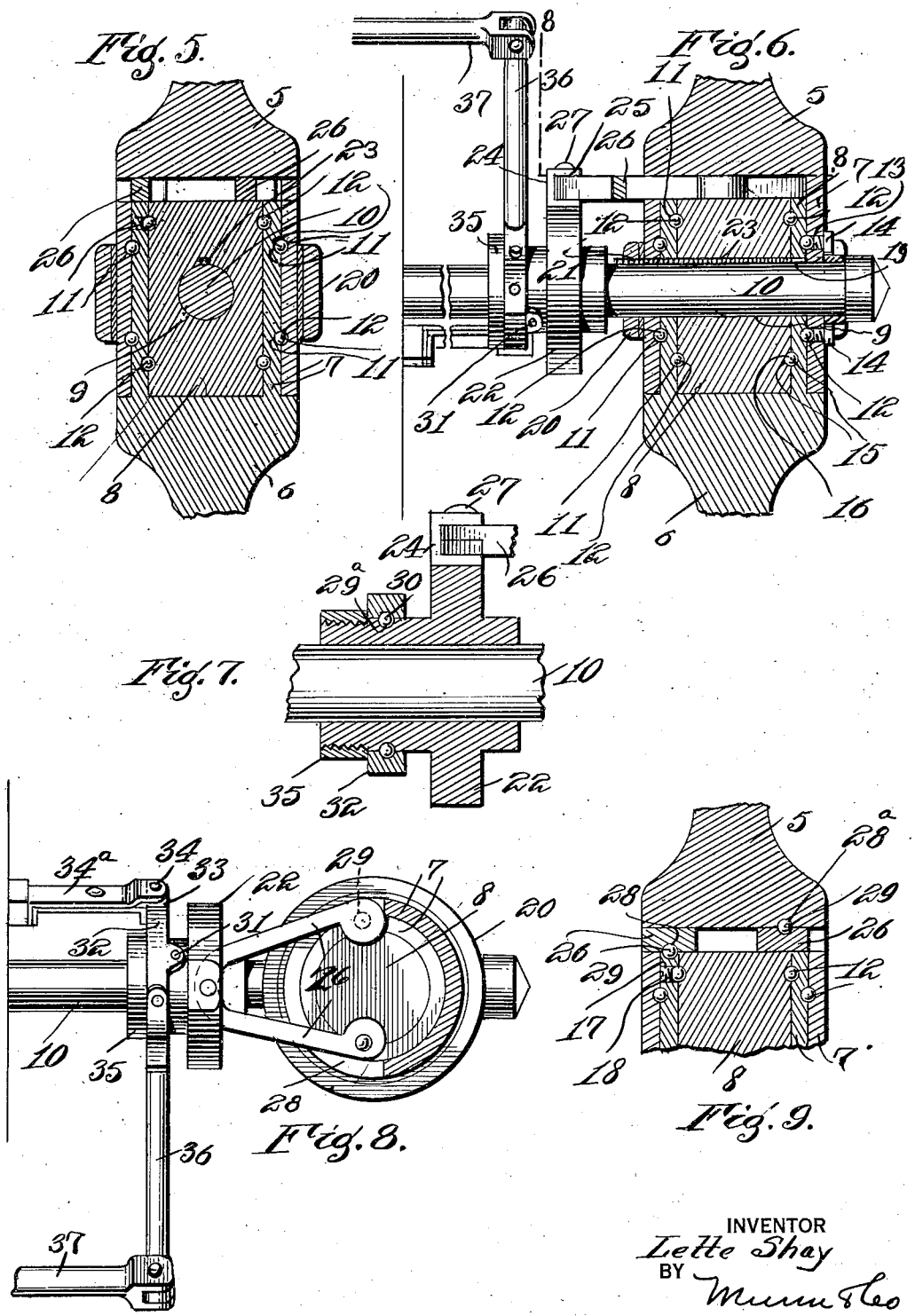

Patented Feb. 2, 1932

1,843,887

UNITED STATES PATENT OFFICE

LETTE SHAY, OF ANN ARBOR, MICHIGAN

VARIABLE PITCH AND REVERSIBLE AERIAL PROPELLER

Application filed July 29, 1929. Serial No. 381,885.

My invention relates to variable pitch and reversible aerial propellers for aeroplanes or other aerial craft.

An object of the invention is to provide a propeller which may be reversed to exert full or part power in one direction or to exert full or part power in the opposite direction while the aeroplane or other craft is in flight.

A further object of the invention is to provide an aeroplane propeller wherein the blade may be manually adjusted to any desired pitch and which embodies but few moving parts.

The invention also contemplates a propeller of this character embodying a pair of rotatably mounted blades which are held in assembled relation by ball and grooved connections, the balls serving the added function of eliminating friction between the movable parts.

With the preceding and other objects and advantages in mind, the invention consists in the novel combination of elements, constructions and arrangements of parts and operations to be hereinafter more fully described and claimed in the accompanying drawings, wherein:

Figure 1 is a front elevation of an aeroplane propeller constructed in accordance with my invention;

Fig. 2 is a similar view taken at right angles to Fig. 1;

Fig. 3 is a fragmentary view partly in section and partly in elevation;

Fig. 4 is a vertical section taken on line 4—4 of Fig. 2;

Fig. 5 is an enlarged longitudinal sectional view of the adjacent ends of the propeller sections;

Fig. 6 is a view partly in side elevation and partly in vertical section;

Fig. 7 is a longitudinal sectional view taken through the slidable collar embodied in the invention;

Fig. 8 is a horizontal section taken on line 8—8 of Fig. 6; and

Fig. 9 is an enlarged sectional detail view.

Referring to the invention in detail a pair of longitudinally alined propeller blades or sections 5 and 6 is provided, the inner end of each being formed with a sleeve 7. As particularly illustrated in Fig. 5 one of the sleeves 7 is of smaller diameter than the other so that the sleeves may be received one within the other.

A cylindrical bearing member 8 is received in the smaller sleeve and is provided with a transverse opening 9 intermediate its end for the reception of the propeller shaft 10.

In order to couple the sections together to permit them to rotate about the bearing member 8 the opposed faces of the sleeves are formed with semi-circular grooves or raceways 11 adjacent their opposite ends in which bearing balls 12 are held, the latter being introduced into the raceways through lateral openings 13 in the outer sleeve 7 and which are normally closed by threaded plugs 14. Similar grooves 15 are formed in the opposed faces of the inner sleeve 7 and the outer face of the bearing member 8 and hold bearing balls 16. The bearing balls 16 are introduced into their grooves through lateral openings 17 provided in the inner sleeve and normally closed by plugs 18.

To permit the sleeves to be rotated they are provided with registering slots 19 through which the shaft 10 passes. Dust and other foreign matter is prevented from passing through the slot by means of a ring or annulus 20 embracing the outer sleeve and having bearing openings 21 at diametrically opposite points through which the shaft passes. For the purpose of adjusting the blades or sections about their axes a collar 22 is arranged on the shaft 10 in advance of the sections for longitudinal adjustment and is held against rotation by a longitudinal key 23 formed with the shaft. A rectangular enlargement 24 is formed on the collar above the shaft and is provided with a slot 25 in which the inner ends of a pair of levers 26 are mounted for pivotal movement about a vertical axis 27. The levers 26 extend through co-inciding slots 28 in the sleeve and are eccentrically connected thereto. The inner ends of these arms are operatively connected with the rotatable propeller sections as disclosed in Fig. 7. The inner ends of the levers are disposed between one end of the bearing member 10 and the inner end of the propeller section 5. Opposed semi-circular sockets 28a are provided in the inner ends of the propeller section 5 and the inner end of one of the levers 26. A locking ball 29 is held between these sockets and an identical connection is provided between the inner end of the other lever 26 and the adjacent end of the inner sleeve 7.

An annulus 29a is received on the inner end of the collar 22 and is locked thereto by locking balls 30 engaging the collar and annulus. Trunnions 31 project from the annulus at diametrically opposite points and are journalled in a split band or lever 32 embracing the annulus, the ends of the band having lateral extensions 33 which are engaged by a pivot 34 passing through a bracket 34a projecting from part of the aeroplane fuselage. A dust ring 35 is threaded on the inner end of the collar and lies against the annulus to preclude the passage of dust to the locking balls. An arm 36 extends laterally from the split band and has operative connection with an operating rod 37, the latter extending longitudinally of the shaft 10 to within convenient reach of the pilot. It will be observed that longitudinal shifting of the rod 36 will correspondingly shift the band 32 on the axis 34a which in turn shifts the annulus to correspondingly shift the collar. Due to the shifting of the collar on the shaft the levers 26 cause the propeller sections to rotate about their axis. It will be thus seen that the propeller sections can be entirely reversed or set at any desired pitch. It will be observed that the levers 26 are located on one side of the axis of rotation of the propeller and in order to obviate vibration due to the location of these levers suitable balance weights may be placed upon the opposite side of the propeller axis.

It will also be seen that the propeller will at all times be properly equalized. In this connection it is pointed out that the propeller sections, due to the connection with the levers 26, must be adjusted in synchronism and maintained against relative turning. Thus the pitch of the blades of both sections will be exactly the same regardless of the adjustment of the lever 32.

What is claimed is:

1. In a propeller, a pair of longitudinally alined propeller blades, a sleeve carried by the inner end of each of the blades and one of which being rotatable about the other, the opposed faces of the sleeves having cooperating raceways, and locking balls in the raceways for holding the sleeves in assembled relation.

2. In a propeller, a pair of longitudinally alined propeller blades, a sleeve carried by the inner end of each of the blades and one of which being rotatable about the other, the opposed faces of the sleeves having cooperating raceways, and locking balls in the raceways for holding the sleeves in assembled relation, and means for rotating the sleeves to vary the pitch of the blades or to reverse the position of the latter.

3. In a propeller, a cylindrical member to be mounted on a propeller shaft, a propeller blade arranged upon each side of the cylindrical member, sleeves carried by the opposed ends of the propeller blade, one of which being revoluble on the cylindrical member and the other being revoluble on the first mentioned sleeve, and means for holding the sleeves in assembled relation on the cylindrical member, and manually operable means for rotating the sleeves about the cylindrical member.

4. In a propeller, a cylindrical member to be fixed to a propeller shaft, a pair of propeller blades each having a sleeve at one end, one of the sleeves being revoluble on the cylindrical member and the other being revoluble on the sleeve, locking balls interposed between the two sleeves and one sleeve and the cylindrical member for holding the parts in assembled relation, and means for rotating the sleeves about the cylindrical member.

5. In a propeller, a cylindrical member to be fixed to a propeller shaft, a pair of propeller blades each having a sleeve at one end, one of the sleeves being revoluble on the cylindrical member and the other being revoluble on the sleeve, locking balls interposed between the two sleeves and one sleeve and the cylindrical member for holding the parts in assembled relation, a longitudinally shiftable member arranged to one side of the blades, and a pair of levers connected therewith and having operative connection with the sleeves whereby to rotate the same about the cylindrical member.

6. In combination, a shaft, a propeller mounted thereon including a pair of variable pitch propeller blades, a collar slidable on the shaft, levers connected with the collar and blades, an annulus embracing the collar and operatively connected therewith, and having pintles at opposite sides, and a manually operable split band embracing the annulus and provided with bearing openings at diametrically opposite points for the reception of trunnions, and a lateral arm projecting from the split band.

7. In a propeller, a pair of longitudinally alined propeller blades, a sleeve carried by the inner end of each of the blades and one of which being revoluble about the other, the opposed faces of the sleeves having cooperating race ways, locking balls in the race ways for holding the sleeves in assembled relation, and a pair of levers eccentrically connected with the sleeves, and a pair of divergent levers each having one end eccentrically connected with one of the sleeves, and means for shifting the levers whereby to rotate the sleeves relatively to each other.

LETTE SHAY.